(12) United States Patent
Lee et al.

(10) Patent No.: US 9,158,861 B1
(45) Date of Patent: *Oct. 13, 2015

(54) INDICATORS FOR ENTITIES CORRESPONDING TO SEARCH SUGGESTIONS

(71) Applicant: Google Inc., Mountain View, CA (US)

(72) Inventors: Michelle I. Lee, Philadelphia, PA (US); Keekim J. Heng, Zurich (CH); Jocelyn Lin, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/183,058

(22) Filed: Feb. 18, 2014

Related U.S. Application Data

(63) Continuation of application No. 13/483,378, filed on May 30, 2012, now Pat. No. 8,671,106.

(60) Provisional application No. 61/650,630, filed on May 23, 2012.

(51) Int. Cl.
G06F 17/30 (2006.01)

(52) U.S. Cl.
CPC ...... G06F 17/3097 (2013.01); G06F 17/30241 (2013.01); G06F 17/30424 (2013.01); G06F 17/30864 (2013.01)

(58) Field of Classification Search
CPC .......... G06F 17/30864; G06F 17/3087; G06F 17/30424
USPC ............................ 707/769, 999.003, 770, 767
See application file for complete search history.

(56) References Cited

U.S. PATENT DOCUMENTS

| | | | |
|---|---|---|---|
| 5,930,474 A | 7/1999 | Dunworth et al. | |
| 6,704,727 B1 | 3/2004 | Kravets | |
| 7,752,326 B2 | 7/2010 | Smit | |
| 7,774,003 B1 | 8/2010 | Ortega et al. | |
| 7,836,044 B2 | 11/2010 | Kamvar et al. | |
| 8,060,639 B2 | 11/2011 | Smit et al. | |
| 8,112,529 B2 | 2/2012 | Van Den Oord et al. | |
| 8,145,416 B2 | 3/2012 | Wailes et al. | |
| 8,156,109 B2 | 4/2012 | Kamvar et al. | |
| 8,271,471 B1 | 9/2012 | Kamvar et al. | |

(Continued)

OTHER PUBLICATIONS

M. Tanaka et al., A Visual User Interface for Map Information Retrieval Based on Semantic Significance, vol. 14, May 1988, 666-670.*

*Primary Examiner* — Jean B Fleurantin
(74) *Attorney, Agent, or Firm* — Marshall, Gerstein & Borun LLP

(57) ABSTRACT

Methods, systems, and apparatus, including computer programs encoded on a computer storage medium, for dynamically generating indicators of entity locations on an electronic map corresponding, for example, to a suggested search request. In one aspect, a method includes providing an electronic map of a geographic area for display on a user interface, receiving a character string entered into the user interface, the character string representing a partial search query, determining a suggested search request based on the character string, and identifying an entity responsive to the suggested search request and a geographic location for the identified entity. An indicator identifying the geographic location of the entity is provided for display on the electronic map.

19 Claims, 6 Drawing Sheets

(56) References Cited

U.S. PATENT DOCUMENTS

| | | |
|---|---|---|
| 8,312,010 B1 | 11/2012 | Chen et al. |
| 8,671,106 B1 | 3/2014 | Lee et al. |
| 2006/0271531 A1 | 11/2006 | O'Clair et al. |
| 2007/0088897 A1 | 4/2007 | Wailes et al. |
| 2009/0106681 A1 | 4/2009 | Gupta et al. |
| 2009/0119289 A1* | 5/2009 | Gibbs et al. .................. 707/5 |
| 2009/0169060 A1 | 7/2009 | Faenger et al. |
| 2010/0118025 A1 | 5/2010 | Smith et al. |
| 2010/0138796 A1* | 6/2010 | Abramson et al. ............ 715/855 |
| 2010/0201707 A1 | 8/2010 | Rasmussen et al. |
| 2010/0205207 A1 | 8/2010 | Dharmarajan et al. |
| 2011/0113064 A1* | 5/2011 | Govindachetty et al. ..... 707/771 |
| 2012/0047134 A1 | 2/2012 | Hansson et al. |
| 2012/0047135 A1 | 2/2012 | Hansson et al. |
| 2012/0117112 A1* | 5/2012 | Johnston et al. .............. 707/771 |
| 2012/0158289 A1* | 6/2012 | Bernheim Brush et al. .. 701/425 |
| 2012/0271848 A1* | 10/2012 | Kadowaki et al. ............ 707/769 |
| 2013/0132359 A1* | 5/2013 | Lee et al. ...................... 707/706 |

* cited by examiner

INDICATORS FOR ENTITIES CORRESPONDING TO SEARCH SUGGESTIONS

CROSS-REFERENCE TO RELATED APPLICATIONS

This application is continuation of U.S. patent application Ser. No. 13/483,378 filed May 30, 2012, entitled "INDICATORS FOR ENTITIES CORRESPONDING TO SEARCH SUGGESTIONS", now issued U.S. Pat. No. 8,671,106, the disclosure of which is hereby incorporated by reference in its entirety and which claims the benefit under 35 U.S.C. §119(e) of U.S. Patent Application No. 61/650,630, entitled "Indicators for Entities Corresponding to Search Suggestions," filed May 23, 2012.

BACKGROUND

This specification relates to presentation of information about geographic entities on electronic maps.

Online mapping utilities provide a convenient resource to view maps of selected geographic areas and to navigate to different levels of detail (e.g., by zooming in or out) and to different geographic areas (e.g., by panning). In some cases, users can select types of features (e.g., terrain, labels, traffic) that are shown on the map. In addition, users may be able to place markers (e.g., waypoints) on a map, draw lines (e.g., routes) on the map, or associate photos or other information with a location on a map. Online map search tools allow users to search for a location or a business and display a map of an area around the location or business. In some cases, a map displayed in response to a search request includes a pin or other marker that shows a location or the location of a business that is responsive to the search request. Various map tools also provide mechanisms for overlaying routes (e.g., from a user-selected origination location to a user-selected destination location) or other graphical information on a map.

SUMMARY

This specification describes technologies relating to displaying indicators for entities that correspond to search suggestions.

In general, one innovative aspect of the subject matter described in this specification can be embodied in methods that include the actions of providing an electronic map of a geographic area for display on a user interface; receiving a character string entered into the user interface, the character string representing a partial search query; determining a suggested search request based on the character string; identifying an entity responsive to the suggested search request and a geographic location for the identified entity; and providing an indicator for display on the electronic map for the identified entity, wherein the indicator identifies the geographic location of the entity on the electronic map. Other embodiments of this aspect include corresponding systems, apparatus, and computer programs, configured to perform the actions of the methods, encoded on computer storage devices.

These and other embodiments can each optionally include one or more of the following features. The suggested search request are updated as user input is received updating the character string. The indicator for the identified entity is provided for display before receiving a query submission from the user. A listing of at least one of the geographic location or an entity identifier corresponding to the identified entity is provided for display adjacent to the electronic map. A plurality of suggested search requests are provided to the user based on the received character string; a selection of one of the plurality of suggested search requests is received; and an indicator associated with an entity responsive to the selected one of the plurality of suggested search requests is provided. The selected one of the plurality of suggested search requests is selected based on one of a user scrolling to, or a user positioning a pointer on, the selected search request. The electronic map is automatically panned or zoomed based on the geographic location of the identified entity. A distance from a location within the geographic area to the geographic location of the identified entity is determined, and the electronic map is automatically panned or zoomed if the distance is below a predetermined threshold. The one or more suggested search requests include a completion of a partial search request defined by the character string. The one or more suggested search requests include a corrected spelling of at least a partial search request defined by the character string.

In general, another aspect of the subject matter described in this specification can be embodied in methods that include the actions of receiving a character string entered into a user interface, the character string representing a partial search query; identifying a first entity based on the partial search request; determining a location associated with the first entity; displaying an indicator corresponding to the location associated with the first entity on an electronic map; receiving additional user input refining the partial search request; identifying a second entity based on the refined partial search request; determining a location associated with the second entity; and displaying an indicator corresponding to the location associated with the second entity on the electronic map. Other embodiments of this aspect include corresponding systems, apparatus, and computer programs, configured to perform the actions of the methods, encoded on computer storage devices.

These and other embodiments can each optionally include one or more of the following features. The first entity is identified as responsive to a suggested search request determined based on the partial search request. One or more suggested search requests determined based on the partial search request are displayed, and the suggested search requests are updated in response to receiving the additional user input. An identification is displayed of each entity having a corresponding indicator displayed on the electronic map. Each entity is identified based on a correspondence between the partial search request or the refined partial search request and a portion of the identification of the entity. The portion of the identification of the entity corresponding to the partial search request or the refined partial search request is highlighted. The user input is transmitted to a server as the user input is received. The user input is transmitted to the server using asynchronous JavaScript and extensible markup language.

In general, another aspect of the subject matter described in this specification can be embodied in systems that include one or more computers operable to interact with a user device and to: provide an electronic map of a geographic area for display on a user interface; receive a character string entered into the user interface, the character string representing at least a partial search query; determine a suggested search request based on the received user input; determine an entity responsive to the suggested search request and a geographic location for the identified entity; and provide data identifying the determined geographic location for use in displaying an indicator of the identified location on the electronic map. Other embodiments of this aspect include corresponding methods, apparatus, and computer programs, configured to perform the actions of the methods, encoded on computer storage devices.

These and other embodiments can each optionally include one or more of the following features. The one or more computers are operable to generate one or more suggested search requests based on the partial search query. The one or more computers are operable to identify a plurality of entities responsive to the suggested search request.

Particular embodiments of the subject matter described in this specification can be implemented so as to realize one or more of the following advantages. A user can be provided with geographical or textual information about a result with having to enter and submit an entire search query. A preview of potential search results based on a partial search query (or a suggested search query corresponding to the partial search query) can be dynamically updated as a user adds additional characters to a search query. The time taken to carry out tasks in searching maps to look up a business or location can be reduced. The display of potential results on a map can help the user identify a desired result in a set of results that may be potentially ambiguous. The user can be provided with information that is helpful in formulating a search query that is likely to generate more desirable results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

In web browsers, map applications, and other computer or online applications, electronic maps can be used to view the geographic locations of entities and/or places associated with content. For example, electronic maps can display the locations corresponding to businesses, addresses, attractions, neighborhoods, campuses, towns, countries or other geographic locations associated with entities identified in search results. Electronic maps can also display areas that include entities associated with starting points, destinations, or driving directions in map applications. In some implementations, electronic maps can display geographic locations of entities associated with search results associated with a user's search query.

Figure 1:
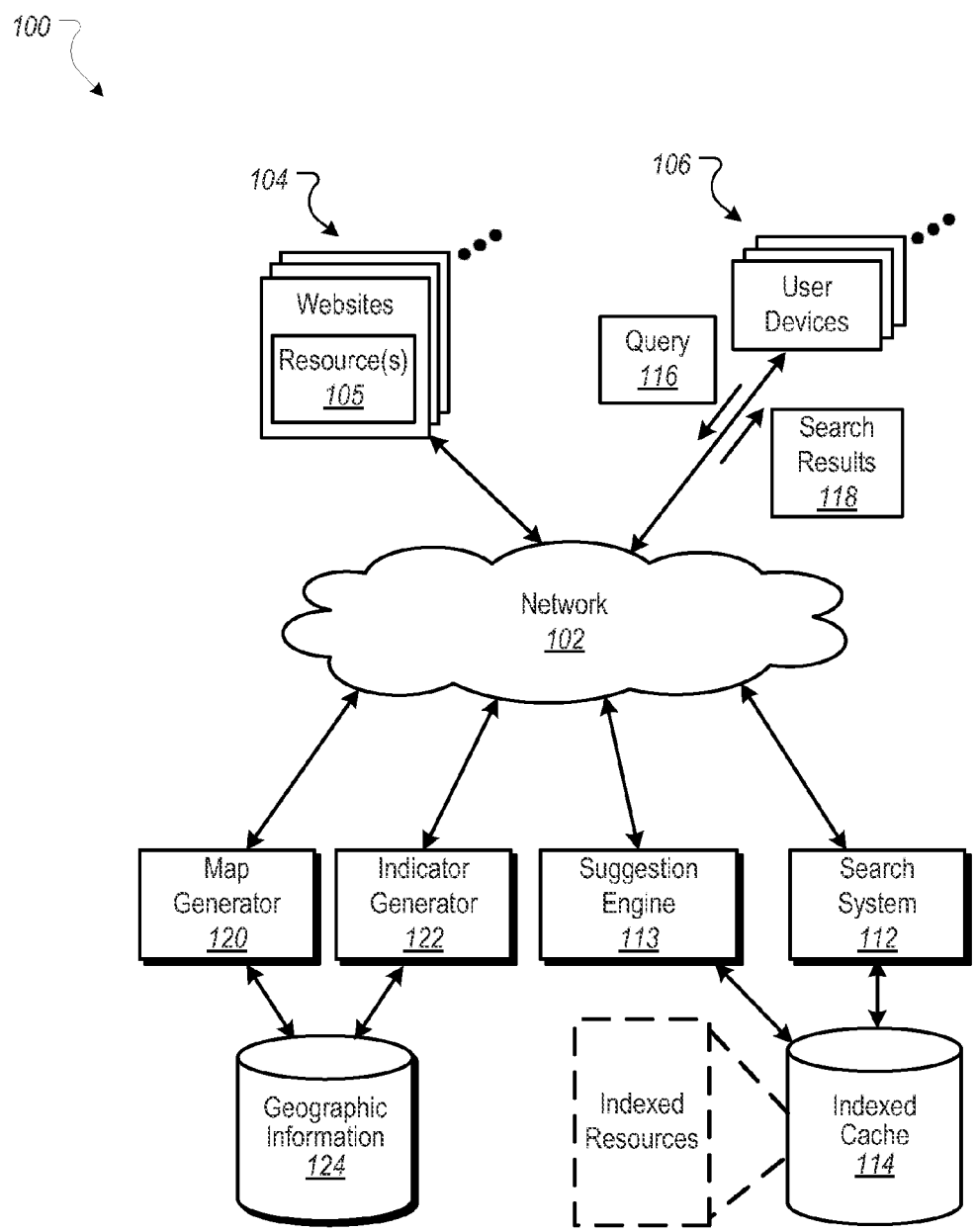
FIG. 1 is a block diagram of an example environment for providing electronic map content.

FIG. 1 is a block diagram of an example environment 100 for providing electronic map content. The environment 100 includes a search system 112 for selecting and providing content in response to a request for content. For example, the request for content can be in the form of a search query 116 submitted by a user of a user device 106. In response to the search query 116, the search system 112 can provide search results 118 to the user device 106.

The environment 100 includes a network 102, such as a local area network (LAN), a wide area network (WAN), the Internet, or a combination thereof. The network 102 connects the user devices 106, the search system 112, websites 104, advertisers, and publishers. The environment 100 can include many thousands of user devices 106, websites 104, advertisers and publishers.

The environment 100 further includes a map generator 120 and an indicator generator 122, which are also connected to the network 102. The map generator 120 can generate an electronic map in situations where the request for content is location-based, e.g., when the request for content or the responsive content is displayable in a map application's viewport. For example, when the search system 112 receives a search query 116 that results in location-based search results 118, location information related to those search results 118 can be provided to the map generator 120 which can generate an electronic map. In some implementations, the search system 112 can send map identification data to the user device 106, which can then use scripts or other ways to request the actual electronic map (e.g., an electronically rendered image of a geographic area or data from which an image of a geographic area can be rendered by the user device or another device) from the map generator 120. In some implementations, the location-based search results 118 can identify the geographic scope (e.g., as boundaries of a geographic area to be mapped) based, for example, on the geographic scope of one or more entities identified in the search results. Example entities include businesses, addresses, attractions, neighborhoods, campuses, towns, countries or other geographic location. The entity and/or its location can cover a small geographic area (e.g., a restaurant, store or single residence) or a larger geographic area (e.g., a city, state or country). Using the received map identification data, the geographic scope, and/or some other input, the map generator 120 can provide the corresponding electronic map(s) to the user device 106. Example electronic maps can include any type of electronic maps such as a road map view, a satellite view, a terrain view, etc. Electronic maps can also be hybrids, containing aspects of different types of views (e.g., a hybrid road-and-satellite view).

The indicator generator 122 can generate indicators for entities displayable within the electronic map generated by the map generator 120. For example, the electronic map, when it is initially displayed on the user device 106, can be provided at a resolution and using a center-point that allows only a subset of the information about responsive entities to be displayed. The indicator generator 122 can generate indicators for entities that are responsive to suggested search requests that correspond to the search query 116 (e.g., search requests that are suggested based on partial user input before the user submits the search request) An indicator can include textual information, e.g., the name of the entity, and/or any other information. In some implementations, an indicator can include a push-pin or other symbol that can be labeled with a letter or identifier, e.g., to correlate with similarly-labeled push-pins in a list of entities that is provided outside of the electronic map.

The map generator 120 and the indicator generator 122 can use a data store of geographic information 124. For example, the map generator 120 can use map identification data to access one or more electronic maps from the geographic information 124. In another example, the map generator 120 can use the geographic scope of a region to access or generate an electronic map using information in the geographic information 124. The indicator generator 122 can use the geographic information 124 to generate indicators, including information that determines the location in which the indicator is to be displayed on the electronic map.

In a detailed example, the search system 112 can receive a search query 116 that includes user input for performing a search for one or more entities. For example, the search query 116 can be a search query that the user inputs in a map search interface for a particular business or type of business located in or near the geographic area represented by an electronic map displayed in the map search interface. In some implementations, the search query 116 can represent a partial query entered by the user, such as a partial search query which may include an incomplete word, "p," which a suggestion engine 113 can use to determine suggested search queries such as park, Paris, parachute and parmesan.

For example, the suggestion engine 113 can determine suggested search requests using a predictive analysis of likely intended search requests. In some implementations, the likely intended search requests can correspond to popular search requests/popular entities, locations or entities that are located near a currently-displayed electronic map and/or a current location, a selected location, or a default location. In some implementations, the suggestion engine 113 can determine likely completions of partial search terms using stemming or other techniques. As a result, the suggestion engine 113 can make a prediction that park, Paris, parachute and parmesan, for example, are four suggested search requests that correspond to the partial search query "p." In some implementations, the suggested search requests can be updated as the user provides additional user input or in some way changes the partial search query. For example, as the user types additional characters, the additional characters can provide more information about the user's intended search request, and new or modified search request suggestions can be generated. The search request suggestions may be modified by removing prior suggested search requests that are inconsistent with the additional characters (e.g., removing Paris when the user types "park") and adding new suggested search requests that are based on the characters that the user has entered (e.g., adding "parking" as another suggested search request). In some cases, the predictive analysis may result in suggested search requests that are somewhat inconsistent with the partial search query submitted by the user (e.g., suggesting "park" when the user incorrectly types "parq"). Similarly, suggested search requests may be somewhat inconsistent with a complete search query submitted by the user. For example, suggested search requests can correct misspellings or suggest refinements to the entered search query (e.g., "park city" or "park place" when the user submits a broader search request for "park").

In some embodiments, the suggested search requests and indicators for search results responsive to the suggested search requests can be provided on an electronic map of a geographical area that is already displayed when the user begins typing the search query 116. In such a case, the suggested search requests and/or the indicators of responsive search results may be limited to or influenced by the currently displayed geographical area. For example, the suggested search requests for one geographic area may be different than the suggested search requests for another geographic area based on different likelihoods of particular search requests for different geographic areas. In addition, the indicators of search results responsive to suggested search requests may be limited to entities that fall within the currently displayed geographic area. As an alternative or in some circumstances (e.g., where a partial search request is determined to be likely to relate to a geographic area other than the currently displayed area, or where the currently displayed area is merely a default area—the entire United States, for example), the search system 112 and the map generator 120 can collectively provide an electronic map of a geographic area for display on a user interface in response to receiving a complete or partial search query 116. For example, if a partial search query 116 is entered, the geographic area that is displayed in the electronic map can correspond to the geographic area that corresponds to one or more search results responsive to the suggested search requests. In another example, the geographic area that is displayed in the electronic map can correspond to the geographic area corresponding to search results associated with a most prominent or most likely-suggested search result. Further, the electronic map can include indicators for entities that are associated with suggested search results that correspond to the partial search query 116.

In some implementations, the indicator generator 122 can use map- and math-related functions (e.g., included with the geographic information 124 and/or executed by scripts) to determine suitable positions for the indicators as well as to determine new positions for the indicators if the electronic map is panned and/or zoomed. In some implementations, the indicators generated by the indicator generator 122 can include information (e.g., a website name, URL, etc.) about a website or resource associated with the geographic location.

The map generator 120 and indicator generator 122 can be used in the context of an overall environment 100 that facilitates accessing websites 104 by user devices 106 over a network 102. A website 104 includes one or more resources 105 associated with a domain name and hosted by one or more servers. An example website is a collection of web pages formatted in hypertext markup language (HTML) that can contain text, images, multimedia content and programming elements, such as scripts. Each website 104 can be maintained by a content publisher, which can be the entity that controls, manages, and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, including electronic maps, words, phrases, images, and sounds, that can include embedded information (e.g., meta-information in hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices (e.g., smartphones), and other devices that can send and/or receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or web page, in which content can be presented. In some cases, the resource 105 itself can include an electronic map, while in other cases an electronic map can be presented as a portion of the resource or user display (e.g., an electronic map of an entity location along with textual or other information about the entity).

To facilitate searching of these resources, the search system 112 can identify the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can access the indexed cache 114 to identify resources that are relevant to the search query 116. The search system 112 identifies the resources in the form of search results 118 and returns the search results 118 to the user devices 106 in search results pages. A search result 118 is data generated by the search system 112 that identifies at least one resource that is responsive to a particular search query, and includes a link to the resource. An example search result 118 can include a web page title, a snippet of text or a portion of an image extracted from the web page, and the URL of the web page. Search results pages can also include one or more slots in which other content (e.g., electronic maps, ads, or other information) can be presented. The search result 118 can also include geographic data from which an electronic map of a geographic location corresponding to the search result 118 can be generated by the map generator 120, and/or an indicator of the geographic location can be generated by the indicator generator 122.

When a resource 105 or search results 118 are requested by a user device 106, the search system 112 can, in some cases, provide additional content with the resource 105 or search results 118. The additional content can include characteristics of slots that are defined for the requested resource or search results page. For example, a reference (e.g., URL) to a resource for inclusion in the slot and a size of the slot can be identified by the search system 112. In some cases, the geographic data from which an electronic map of a geographic location can be generated can be defined by such a reference.

Figure 2:
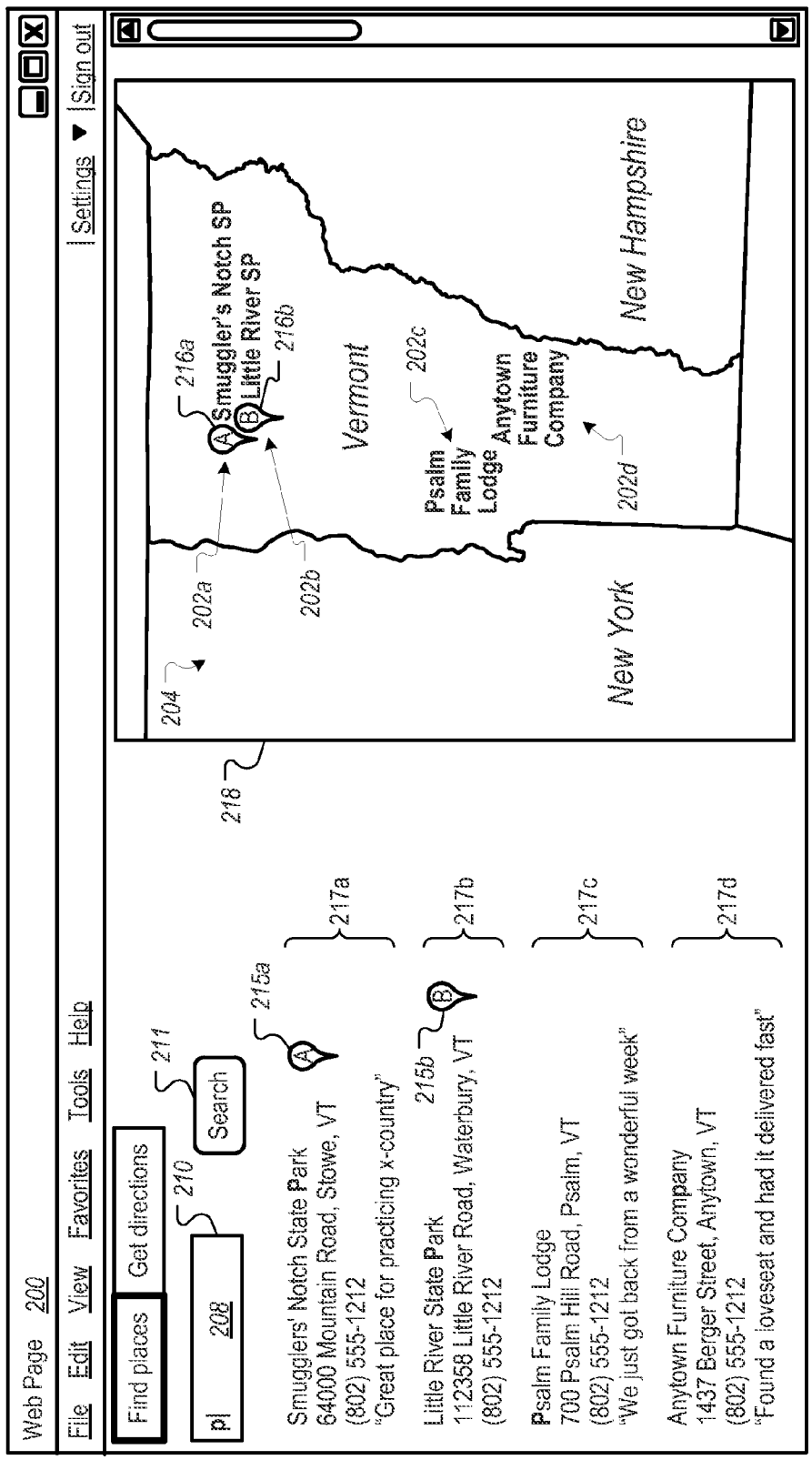
FIG. 2 is a screenshot of an example user interface that includes indicators.

FIG. 2 is a screenshot of an example user interface 200 that includes indicators 202a-202d. The indicators 202a-202d can identify the geographic locations of entities associated with potential search results 217a-217d. The potential search results 217a-217d, for example, can be responsive to suggested search requests that are generated for a partial search query 208 (e.g., "p") entered by a user in a search field 210. For example, the suggested search requests can include park, Paris, parachute and parmesan or other suggestions that correspond to the partial search query 208 of "p." The generation of the suggested search requests (e.g., by the suggestion engine 113) and the indicators 202a-202d (e.g., by the indicator generator 122) can occur before the user selects a search control 211, e.g., to submit a current query in the search field 210. In some implementations, the suggested search requests can be updated as user input identifying additional characters in a partial search request is received, e.g., when the user adds to or changes the a partial search query 208.

In some implementations, user input can be transmitted to a server as the user input is received, e.g., as the user enters the partial search query 208. For example, the user input can be transmitted to the server using asynchronous JavaScript, extensible markup language, etc. A search system (e.g., search system 112 of FIG. 1) can receive the user input, generate the suggested search requests, and generate search results responsive to one or more of the suggested search requests. The search results can include geographic data from which indicators corresponding to the search results can be generated for display on an electronic map.

In some implementations, the indicators 202a-202d can include text that identifies each search result/entity. For example, the text for the indicator 202a can be "Smuggler's Notch State Park" or abbreviated to "Smuggler's Notch SP." Other abbreviations and/or truncations can be used. Text used for indicators can be of a different font, color and/or other visual characteristic than other features on the electronic map 204, e.g., by using bold or italicized font for the names of entities. In some implementations, indicators can include markers, such as push-pins 216a and 216b that correspond to similarly-labeled push-pins 215a and 215b, respectively. For example, the push-pins 215a and 215b can be displayed adjacent to the potential search results 217a and 217b, respectively. The number of push-pins or other markers that are used (or whether they are used) can depend on the number of entities for which indicators are generated on the electronic map 204 and how cluttered the electronic map 204 may otherwise be by using text alone. In some cases, the portion of an entity name that corresponds to a partial search request can be highlighted (e.g., using bold or italics) in displayed entity names in the map and/or in a listing of search results displayed adjacent to the map.

In some implementations, the suggested search requests can be displayed, e.g., below or adjacent to the search field 210. However, in the example shown in FIG. 2, the suggested search requests are determined in the background (but not displayed). In some implementations, one or more prominent (or more likely) suggested search requests (e.g., as determined by a predictive analysis) are used to generate potential search results 217a-217d. In the illustrated example, each of the potential search results 217a-217d is associated with an entity that contains the letter "p" and further matches one of the suggested search requests. In some implementations, the potential search results for which indicators are displayed can be selected according to both the likelihood of the suggested search request and the likelihood that a particular search result will be selected by a user (e.g., based on statistical data on anonymous prior users of the search system). For example, indicators can be displayed for the most likely search results responsive to the most likely suggested search requests. In some cases, the likelihood of each search result can be weighted according to the likelihood of the corresponding search request to determine the most likely search results.

In some implementations, the electronic map 204 can be automatically panned and/or zoomed based on a location of at least one identified entity responsive to a suggested search query. For example, an identified entity (e.g., a state park in eastern New Hampshire) can have a location just outside of the geographic area represented by the electronic map 204. In this case, the electronic map 204 can be panned and/or zoomed to include the location (and other locations of other entities to be represented by indicators on the electronic map 204). In some implementations, a distance can be determined from the geographic area to the location of the at least one identified entity, and the panning and/or zooming can be performed only if the distance is below a predetermined threshold. Otherwise, the location can be skipped (e.g., not represented by an indicator) so that moving to the location, or including the location in the electronic map 204, does not require a significant change to or movement of the map.

In the example shown in FIG. 2, the indicators 202a-202d are included on the electronic map 204, e.g., that displays the geographic area around Vermont. In some implementations, the electronic map 204, including the indicators 202a-202d, can be displayed within a viewport 218, e.g., by a map application in a window of a web browser.

While the electronic map 204 and the geographic area that it displays both have a rectangular shape in this example, other shapes can be used, including any kind of polygon (e.g., a rectangle with one or more cutouts, or some other polygon). A cutout in an electronic map can be used, for example, to accommodate other information or content.

When the electronic map 204 is displayed in a window of a web browser, for example, user input in the browser can include a navigational search query (i.e., a query for a specific entity), or in some cases an exploratory or categorical search query, that results in a limited number of potential search results 217a-217d. In some implementations, the query can be received through a map search interface or a web search interface. The indicators 202a-202d can correspond to entities associated with the potential search results 217a-217d.

In some implementations, the electronic map 204 can be displayed before the user begins to enter a search query, for example, in response to a previous search request for a different entity. In this example, the electronic map 204 can be displayed initially without the indicators 202a-202d. Then, after part of the partial search query 208 (e.g., "p") is entered, one or more indicators 202a-202d can be displayed on the electronic map 204. For example, the indicators 202a-202d can be provided when the partial search query 208 is sufficient to identify or correspond to keywords or place names that are likely completions of the partial search query 208. Further, indicators such as the indicators 202a-202d can change automatically to correspond to the current state of the partial search query 208, e.g., as each letter is added to (or deleted from) the partial search query 208. In some cases, indicators may not be displayed until one or more likely search results responsive to one or more likely suggested search requests have been identified.

In some implementations, a selection of any one of the indicators 202a-202d by the user (e.g., using a mouse-over or a mouse-click) can result in displaying information associated with the entity or the geographic location. For example, if the user moves a cursor over the indicator 202a, a pop-up or other displayed element can appear that provides additional information about the entity, e.g., Smuggler's Notch State Park. In some implementations, other mechanisms can be provided by which the user can obtain additional information, such as menu selections from a tool bar, "more info" controls on the indicators 202a-202d, or right mouse button options.

Figure 3:
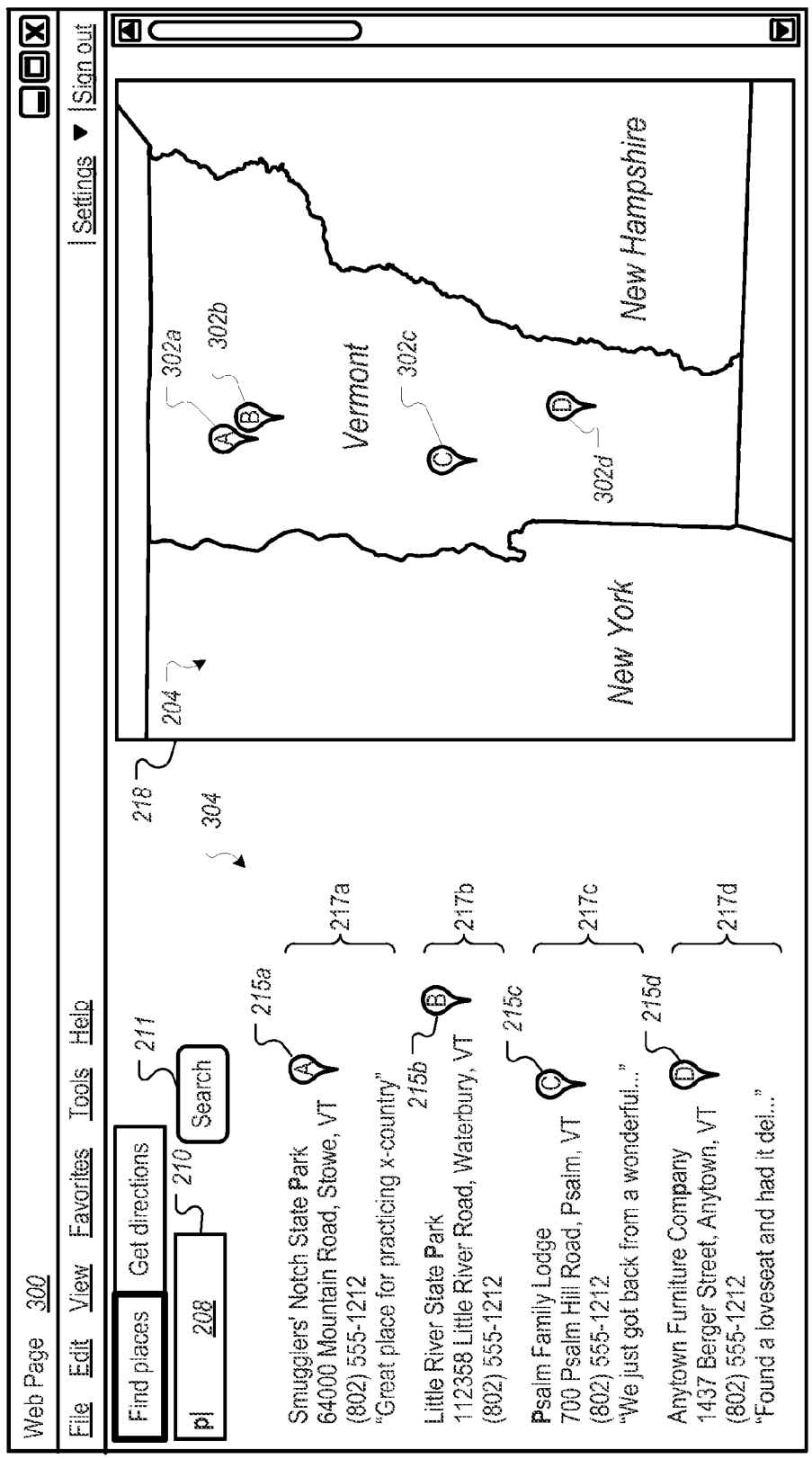
FIG. 3 is a screenshot of the example user interface that includes a listing of entities corresponding to indicators.

FIG. 3 is a screenshot of the example user interface 200 that includes a listing 304 of entities corresponding to indicators 302a-302d. For example, the listing 304 can be in the form of potential search results that are displayed adjacent to the electronic map 204. The listing 304 can identify the geographic location and/or an entity identifier corresponding to each entity indicated by the indicators 302a-302d. For example, instead of including text for names of the entities within the electronic map 204 itself (e.g., as is shown in FIG. 2), indicators 302a-302d can use labeled push-pins alone to mark the geographic locations of entities associated with potential search results 217a-217d. As described above, the potential search results 217a-217d, for example, can correspond to suggested search requests (e.g., park, Paris, parachute and parmesan) that are generated for a partial search query 208 (e.g., "p") entered by a user in a search field 210. To identify the entity names (e.g., Smuggler's Notch State Park, etc.), the user can match labeled push-pins of the indicators 302a-302d with corresponding push-pins 215a-215d, respectively, that appear with the potential search results 217a-217d. In some implementations, by rolling a cursor over a particular one of the potential search results 217a-217d or the corresponding indicator 302a-302d, the other can be highlighted. For example, rolling the cursor over the indicator 302a can cause the potential search result 217a to become highlighted, e.g., by bold or italicized font, back-shading, or in some other way.

Figure 4:
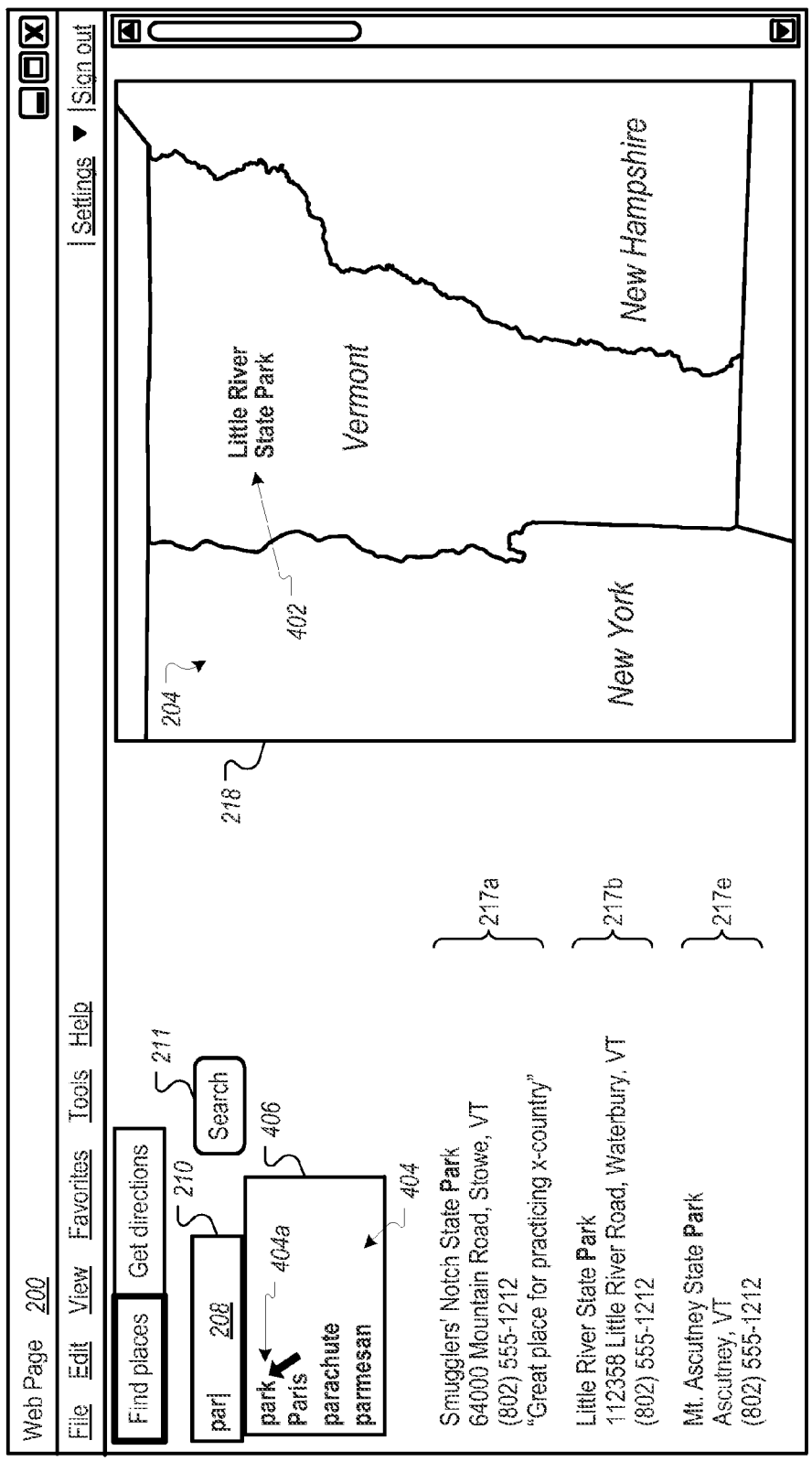
FIG. 4 is a screenshot of the example user interface that includes an indicator for an entity that is associated with a selected suggested search request.

FIG. 4 is a screenshot of the example user interface 200 that includes an indicator 402 for an entity that is associated with a selected suggested search request 404a. In general, FIG. 4 illustrates an alternative user interface 200 to that shown in FIGS. 2 and 3 in that it further shows a drop down box with a list of suggested search queries as opposed to hiding the suggested search queries. A user can select from the list of suggested search queries to display search results corresponding to the selected suggested search query. For example, the user can select the suggested search request 404a (e.g., "park") from a group of suggested search requests 404 that can appear in a suggestions box 406 (e.g., below the search field 210). The suggestion engine 113, for example, can generate the suggested search requests 404 based on the partial search query 208 (e.g., "par") entered in the search field 210, as described above. The suggestion engine 113 can generate the suggested search requests 404 (i.e., park, Paris, parachute and parmesan) because each suggested search request starts with the same letters (e.g., "par") that are included in the partial search query 208. The user can use up and down arrow keys or some other scrolling control to move between different suggested search requests in the group 404, and the search system will determine the currently selected suggested search request and send instructions to display an indicator 402 responsive to the currently selected suggested search request 404a. Alternatively, the user can position a pointer to select one of the suggested search requests 404, and the electronic map 204 can be likewise updated with the indicator 402. The indicator 402 and other indicators can be associated with entities that are responsive to the selected suggested search request 404a.

In some implementations, the suggested search requests can be presented in order of their likelihood, the first or most likely search request (e.g., 404a) can be automatically selected, and its responsive search results 402 can be automatically displayed without user interaction.

Figure 5:
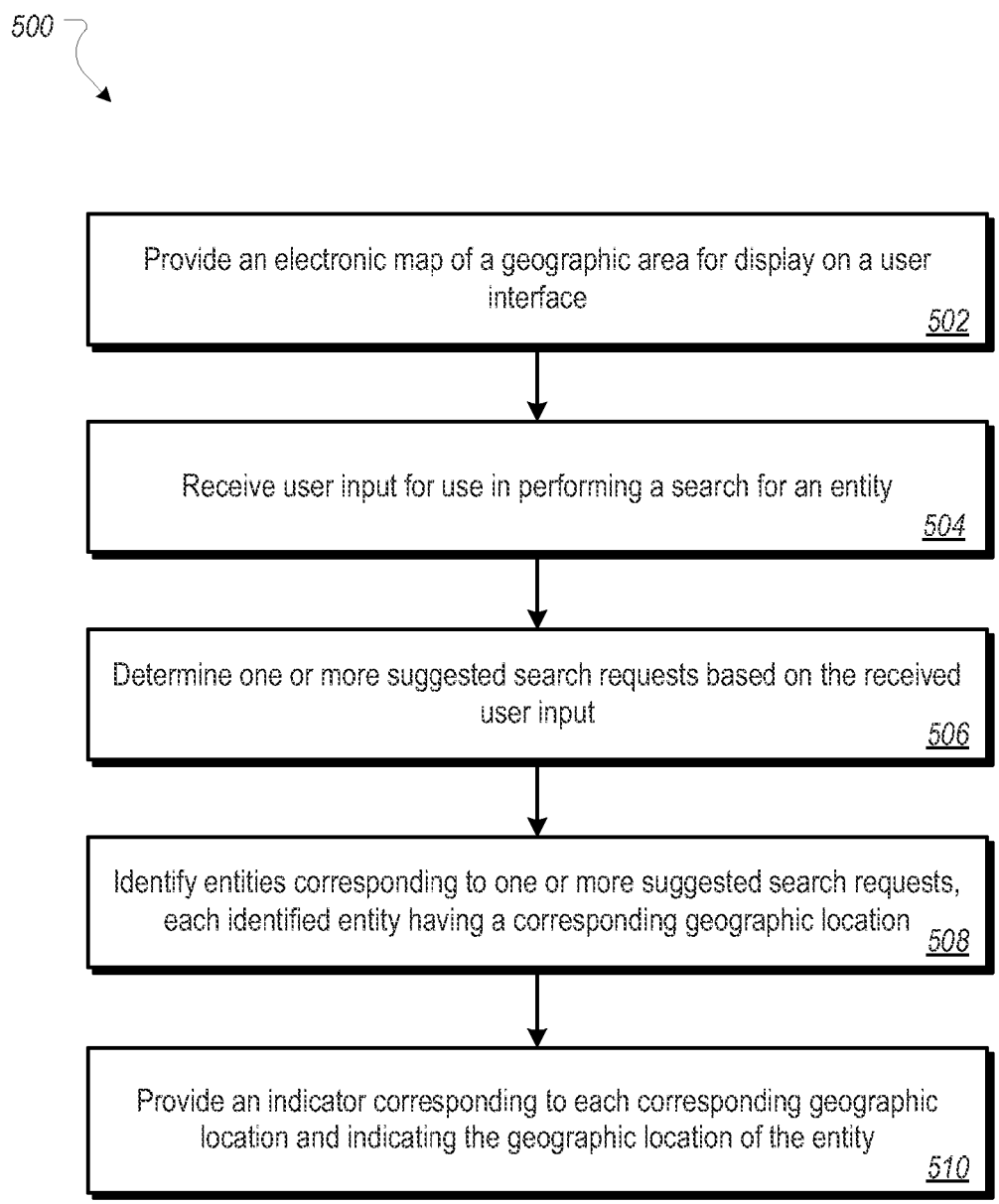
FIG. 5 is a flow diagram of an example process for providing indicators for entities that correspond to a suggested search request.

FIG. 5 is a flow diagram of an example process 500 for providing indicators for entities that are responsive to a suggested search request. The process 500 can be performed, for example, by the map generator 120, the suggestion engine 113, and the indicator generator 122, e.g., using geographic information 124. Multiple servers can perform the operations of the process 500. For example, the map generator 120 and the indicator generator 122 can be on the same server or different servers, and the suggestion engine 113 can be on the same or a different server. Further, the geographic information 124 can be stored remotely from the map generator 120, the suggestion engine 113, and the indicator generator 122, e.g., distributed at several locations. For example, servers or groups of servers that generate indicators for entities can be different from the servers that perform a search for a place/entity, identify the location of the place/entity, identify the boundaries of the geographic area that is mapped, generate or retrieve the actual map, and/or send the map to the user device. Indeed, each of the operations of the process 600 can be performed by different servers. On the other hand, the receiving and determining operations can, for example, include receiving the data from another block of code within the same computer program or a different module within the same server. In some implementations, the one or more computers can include a server operable to interact with the device (e.g., the user device 106) through a data communication network (e.g., the network 102). For example, the user device 106 can interact with the server as a client.

An electronic map of a geographic area is provided for display on a user interface (502). As an example, the electronic map 204 (e.g., a road map view, satellite view, terrain view, etc.) can be displayed on the web page 200. The geographical area represented by the electronic map 204 can correspond, for example, to a previously-entered search query by the user (e.g., related to the Vermont area). In another example, the geographical area represented by the electronic map 204 can correspond to the geographic locations of one or more entities responsive to suggested search requests for the current or a previous search query.

User input is received for use in performing a search for one or more entities (504). For example, the user input can be received in a map search interface, e.g., when the user enters "par" as the partial search query 208 in the search field 210.

One or more suggested search requests is determined from the received user input (506). The suggested search requests can be determined from a predictive analysis of likely intended search requests, e.g., based on popular search requests and popular entities, proximity to currently displayed map view, proximity to current location, a selected location, a default location, or likely completions of partial search terms, etc. For example, the suggestion engine 113 can produce suggested search requests that include park, Paris, parachute and parmesan based on a prediction that the user's intended search query may include part or all of those terms. In this example, the prediction is based on a single letter "p" as the partial search query 208, but other predictions can be based on partial search queries 208 that include several characters and/or multiple terms.

Entities are identified that are responsive to one or more of the suggested search requests (508). The entities can be identified using a search engine that determines and ranks search results responsive to the one or more suggested search requests. Each entity (e.g., business, address, attraction, neighborhood, campus, town, country, etc.) that is identified has a corresponding geographic location which may cover a small geographic area (e.g., a business) or a larger geographic area (e.g., a city or state). For example, the search system 112 and/or the suggestion engine 113 can identify entities that include Smugglers' Notch State Park, Little River State Park, Psalm Family Lodge, and so on (e.g., each entity name containing "p"). The entities in this example correspond to potential search results 217*a*-217*d* that can be displayed on the web page 200 in response to one or more suggested search queries (e.g., park, Paris, parachute and parmesan) that are based on the partial search query 208. For example, two of the entities identified in the current example are state parks. In some implementations, the entities can be identified by accessing a place search service, which may reside on a separate system.

An indicator corresponding to the geographic location of at least some of the identified entities responsive to the suggested search queries is provided for display on the electronic map (510). Each indicator is adapted for display on the electronic map and identifies the geographic location of the corresponding entity. For example, the indicator generator 122 can provide the indicators 202*a*-200*d* that correspond to the entities Smugglers' Notch State Park, Little River State Park, Psalm Family Lodge, and Anytown Furniture Company, respectively.

In some implementations, indicators can be provided as part of the electronic map. For example, a map application can generate the indictors at the same time that the electronic map is created. In some implementations, indicators can be provided for addition to or overlay on the electronic map. For example, the indicators can be provided as layers or overlays to the electronic map.

Figure 6:
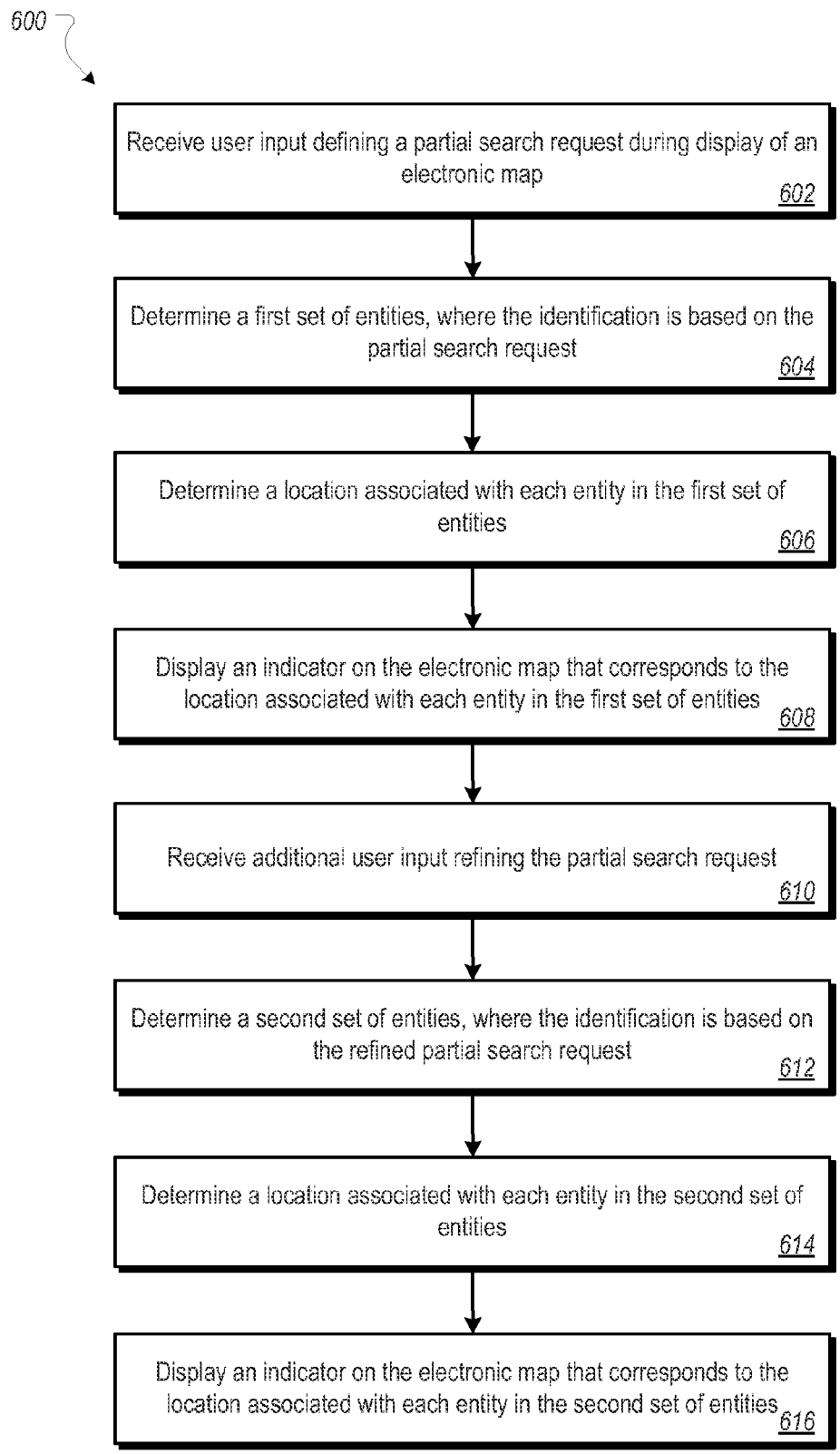
FIG. 6 is a flow diagram of an example process for providing indicators for entities that correspond to potential search results.

FIG. 6 is a flow diagram of an example process 600 for providing indicators for entities that correspond to potential search results. The indicators can be provided for entities that are responsive to a received partial search request without necessarily generating predicted search requests for the partial search request. The process 600 can be performed, for example, by the map generator 120, the suggestion engine 113, and the indicator generator 122, e.g., using geographic information 124. In some implementations, the process 600 can be implemented on a client device, e.g., using scripts that carry out at least some of the functionality. Multiple servers can perform the operations of the process 500. For example, the map generator 120 and the indicator generator 122 can be on the same server or different servers, and the suggestion engine 113 can be on the same or a different server. Further, the geographic information 124 can be stored remotely from the map generator 120, the suggestion engine 113, and the indicator generator 122, e.g., distributed at several locations. For example, servers or groups of servers that generate indicators for entities can be different from the servers that perform a search for a place/entity, identify the location of the place/entity, identify the boundaries of the geographic area that is mapped, generate or retrieve the actual map, and/or send the map to the user device. In fact, each of the operations of the process 600 can be performed by different servers. On the other hand, the receiving operations can, for example, include receiving the data from another block of code within the same computer program or a different module within the same server. In some implementations, the one or more computers can include a server operable to interact with the device (e.g., the user device 106) through a data communication network (e.g., the network 102). For example, the user device 106 can interact with the server as a client.

A partial search request is received from a user during display of an electronic map (602). For example, the user can enter the partial search query 208 "p" in the search field 210 on the electronic map 204, as shown in FIG. 2. A first set of entities is determined based on the partial search request (604). For example, the suggestion engine 113 and/or the search system 112 can identify entities such as Smugglers' Notch State Park, Little River State Park, Psalm Family Lodge, etc. by searching a GIS (geographic information system) for entity names that contain the letter "p" and that are located within the geographic area represented by the electronic map 204. A location associated with each entity in the first set of entities is determined (606). In some implementations, locations can be obtained from repositories that store geographic locations for entities throughout the world. An indicator that corresponds to the location associated with each entity in the first set of entities is generated for display on the electronic map (608). For example, indicators 202*a*-202*d* can be generated by the indicator generator 122, and the indicators can be provided for display on the electronic map 204. Additional user input can be received that refines the partial search request (610). For example, the user can enter additional characters (e.g., "ar") for the partial search query 208, resulting in transforming the query "p" to "par," as shown in FIG. 4. A second set of entities can be determined based on the refined partial search request (612). The second set of entities that may or may not overlap with the first set of entities. For example, if the second set of entities include "par" in the name, they would include state parks found in the first set of entities, may add additional state parks, but would exclude entities in the first set of entities that do not include the phrase "par" such as Psalm Family Lodge. A location associated with each entity in the second set of entities is determined (614). An indicator that corresponds to the location associated with each entity in the second set of entities is generated for display on the electronic map (616). For example, the indicator generator 122 can generate indicators such as the indicators 202a-202b for each of the state parks, and the indicators can be displayed on the electronic map 204. An electronic document, such as the electronic map 204 (which for brevity will simply be referred to as a document) may, but need not, correspond to a file. A document may be stored in a portion of a file that holds other documents, in a single file dedicated to the document in question, or in multiple coordinated files.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    providing, via a processor, an electronic map of a geographic area for display on a user interface, the electronic map displaying a first set of one or more entities responsive to a previously received partial search query, the partial search query comprising an incomplete word;
    receiving a character string entered into the user interface, the character string representing an update to the previously received partial search query;
    determining a suggested search request based on the updated partial search query;
    identifying a second set of one or more entities responsive to the suggested search request and a geographic location for each entity in the second set, wherein each entity in the second set of entities is identified based on a likelihood the entity was previously selected by users when previously presented in response to the suggested search request;
    automatically panning or zooming the electronic map based on the geographic locations of the second set of entities; and
    providing an indicator for display on the electronic map for the geographic location of each entity in the second set of entities.

2. The method of claim 1 further comprising updating the suggested search request as additional user input is received updating the partial search query.

3. The method of claim 1 wherein the indicator for each entity in the second set of entities is provided for display before receiving a query submission from the user.

4. The method of claim 1, wherein the indicator includes textual information about each entity in the second set of entities.

5. The method of claim 1 wherein determining a suggested search request further comprises:
    providing a plurality of suggested search requests to the user based on the updated partial search query; and
    receiving a selection of one of the plurality of suggested search requests.

6. The method of claim 5 wherein the selection of one of the plurality of suggested search requests is based on one of a user scrolling to or a user positioning a pointer on the selected search request.

7. The method of claim 1 further comprising panning or zooming the electronic map based on the locations of the one or more entities in the second set of entities.

8. The method of claim 1 wherein the suggested search request is a most likely completion of the partial search request.

9. The method of claim 1 wherein suggested search request is a corrected spelling of the partial search request.

10. A non-transitory tangible computer storage medium encoded with a computer program, the program comprising instructions that when executed by data processing apparatus cause the data processing apparatus to perform operations including:
    providing, via a processor, an electronic map of a geographic area for display on a user interface, the electronic map displaying a first set of one or more entities responsive to a previously received partial search query, the partial search query comprising an incomplete word;

receiving a character string entered into a user interface, the character string representing an update to the previously received partial search query;
determining a suggested search request based on the updated partial search query;
identifying a second set of one or more entities responsive to the suggested search request and a geographic location for each entity in the second set, wherein each entity in the second set of entities is identified based on a likelihood the entity was previously selected by users when previously presented in response to the suggested search request;
automatically panning or zooming the electronic map based on the geographic locations of the second set of entities; and
providing an indicator for display on the electronic map for the geographic location of each entity in the second set of entities.

11. The computer storage medium of claim 10, wherein the program further comprises instructions that when executed by data processing apparatus cause the data processing apparatus to perform operations including: updating the suggested search request as additional user input is received updating the partial search query.

12. The computer storage medium of claim 10 wherein indicators for each entity in the second set of entities are provided for display before receiving a query submission from the user.

13. The computer storage medium of claim 10, wherein the indicator includes textual information about each entity in the second set of entities.

14. The computer storage medium of claim 10 wherein determining a suggested search request further comprises:
providing a plurality of suggested search requests to the user based on the updated partial search query; and
receiving a selection of one of the plurality of suggested search requests.

15. The computer storage medium of claim 14 wherein the selection of one of the plurality of suggested search requests is based on one of a user scrolling to or a user positioning a pointer on the selected search request.

16. The computer storage medium of claim 10 wherein the program further comprises instructions that when executed by data processing apparatus cause the data processing apparatus to perform operations including: panning or zooming the electronic map based on the locations of the one or more entities in the second set of entities.

17. A system comprising:
one or more computers operable to interact with a user device and to:
provide, via a processor, an electronic map of a geographic area for display on a user interface, the electronic map displaying a first set of one or more entities responsive to a previously received partial search query;
receive a character string entered into the user interface, the character string representing an update to the previously received partial search query, the partial search query comprising an incomplete word;
determine a suggested search request based on the updated partial search query;
identify a second set of one or more entities responsive to the suggested search request and a geographic location for each entity in the second set, wherein each entity in the second set of entities is identified based on a likelihood the entity was previously selected by users when previously presented in response to the suggested search request;
automatically pan or zoom the electronic map based on the geographic locations of the second set of entities; and
provide an indicator for display on the electronic map for the geographic location of each entity in the second set of entities.

18. The system of claim 17 wherein the one or more computers are operable to update the suggested search request as additional user input is received updating the partial search query.

19. The system of claim 17 wherein indicators for each entity in the second set of entities are provided for display before receiving a query submission from the user.

* * * * *